US009069946B2

(12) United States Patent
Markel et al.

(10) Patent No.: US 9,069,946 B2
(45) Date of Patent: Jun. 30, 2015

(54) METHOD AND SYSTEM FOR AUTHENTICATION OF DEVICE USING HARDWARE DNA

(71) Applicant: Broadcom Corporation, Irvine, CA (US)

(72) Inventors: Shlomo Markel, Haifa (IS); Jacob Mendel, Kibutz Givat Brenner (IS)

(73) Assignee: Broadcom Corporation, Irvine, CA (US)

( * ) Notice: Subject to any disclaimer, the term of this patent is extended or adjusted under 35 U.S.C. 154(b) by 0 days.

(21) Appl. No.: 13/865,044

(22) Filed: Apr. 17, 2013

(65) Prior Publication Data

US 2014/0082720 A1   Mar. 20, 2014

Related U.S. Application Data

(60) Provisional application No. 61/702,698, filed on Sep. 18, 2012.

(51) Int. Cl.
*G06F 7/04* (2006.01)
*G06F 12/00* (2006.01)
*G06F 12/14* (2006.01)
*G06F 13/00* (2006.01)
*G06F 17/30* (2006.01)
*G11C 7/00* (2006.01)
*G06F 21/44* (2013.01)

(52) U.S. Cl.
CPC ................................. *G06F 21/44* (2013.01)

(58) Field of Classification Search
CPC ......... G06F 12/31; G06F 21/00; G06F 21/36; G06F 21/44; G06F 2221/2149
USPC ............................................................ 726/16
See application file for complete search history.

(56) References Cited

U.S. PATENT DOCUMENTS

2003/0136837 A1* 7/2003 Amon et al. ................... 235/435
2012/0104278 A1* 5/2012 Downing et al. ........... 250/458.1

* cited by examiner

*Primary Examiner* — Kambiz Zand
*Assistant Examiner* — Stephen Sanders
(74) *Attorney, Agent, or Firm* — Sterne, Kessler, Goldstein & Fox PLLC

(57) ABSTRACT

Methods and systems for authentication of a device are disclosed. An exemplary method includes transmitting an energy towards the device including a material, monitoring a response of the device to the transmitted energy, generating a signature of the device based on the response of the device to the transmitted energy, comparing the device signature to an enrolled signature for the device, and indicating that authentication of the device is successful when the generated signature matches the enrolled signature. An exemplary system includes a transmitter configured to transmit an energy towards the device, a receiver configured to monitor a response of the device, and a processor configured to generate a signature of the device based on the response of the device, compare the device signature to an enrolled signature for the device, and indicate that authentication of the device is successful when the generated signature matches the enrolled signature.

20 Claims, 4 Drawing Sheets

METHOD AND SYSTEM FOR AUTHENTICATION OF DEVICE USING HARDWARE DNA

CROSS REFERENCE TO RELATED APPLICATIONS

The present application claims the benefit of U.S. Provisional Application No. 61/702,698, filed Sep. 18, 2012, which is incorporated herein by reference in its entirety.

FIELD

Certain embodiments of the disclosure relate generally to authentication of a device.

BACKGROUND

Devices such as mobile phones, computers, laptops, tablets, personal digital assistants, etc., have become ubiquitous, particularly in the workplace. Such devices may be used to receive, transmit, store, and generate confidential information. Furthermore, such devices are highly portable and may be carried into and out of secure facilities or may be used to gain access to those facilities. An unauthorized person interested in accessing confidential information or in gaining access to secure facilities may do so by replacing an authentic device with a cloned counterfeit device or by inserting additional electronic equipment into the device.

Current authentication procedures focus primarily in validating a user of a device. Authentication of a device is typically limited to visual authentication. For example, verification of serial number, make, and/or model of the device. However, as discussed above, this authentication may not be sufficiently strong for certain applications.

BRIEF DESCRIPTION OF THE DRAWINGS/FIGURES

Exemplary embodiments are described with reference to the accompanying drawings. In the drawings, like reference numbers indicate identical or functionally similar elements. Additionally, the left most digit(s) of a reference number identifies the drawing in which the reference number first appears.

DETAILED DESCRIPTION

The following Detailed Description refers to accompanying drawings to illustrate various exemplary embodiments. References in the Detailed Description to "one exemplary embodiment," "an exemplary embodiment," "an example exemplary embodiment," etc., indicate that the exemplary embodiment described may include a particular feature, structure, or characteristic, but every exemplary embodiment may not necessarily include the particular feature, structure, or characteristic. Moreover, such phrases are not necessarily referring to the same exemplary embodiment. Further, when a particular feature, structure, or characteristic is described in connection with an exemplary embodiment, it is within the knowledge of those skilled in the relevant art(s) to affect such feature, structure, or characteristic in connection with other exemplary embodiments whether or not explicitly described.

The various exemplary embodiments will so fully reveal the general nature of the invention that others can, by applying knowledge of those skilled in relevant art(s), readily modify and/or adapt for various applications such exemplary embodiments, without undue experimentation, without departing from the spirit and scope of the invention. Therefore, such adaptations and modifications are intended to be within the meaning and plurality of equivalents of the exemplary embodiments based upon the teaching and guidance presented herein. It is to be understood that the phraseology or terminology herein is for the purpose of description and not of limitation, such that the terminology or phraseology of the present specification is to be interpreted by those skilled in relevant art(s) in light of the teachings herein.

Users can access information using a wide variety of devices including mobile phones, computers, laptops, personal digital assistants, tablets, etc. These devices are made of a plurality of materials, and at least some of these materials emit a unique measurable reaction when being exposed to a particular energy. This unique measurable reaction is referred hereinafter as the device's hardware DNA.

A device's hardware DNA may be used as a factor to authenticate the device. For example, in a workplace environment, an exemplary embodiment can authenticate an organization-issued device by comparing the device's hardware DNA to a corresponding enrolled hardware DNA signature for the device.

Figure 1:
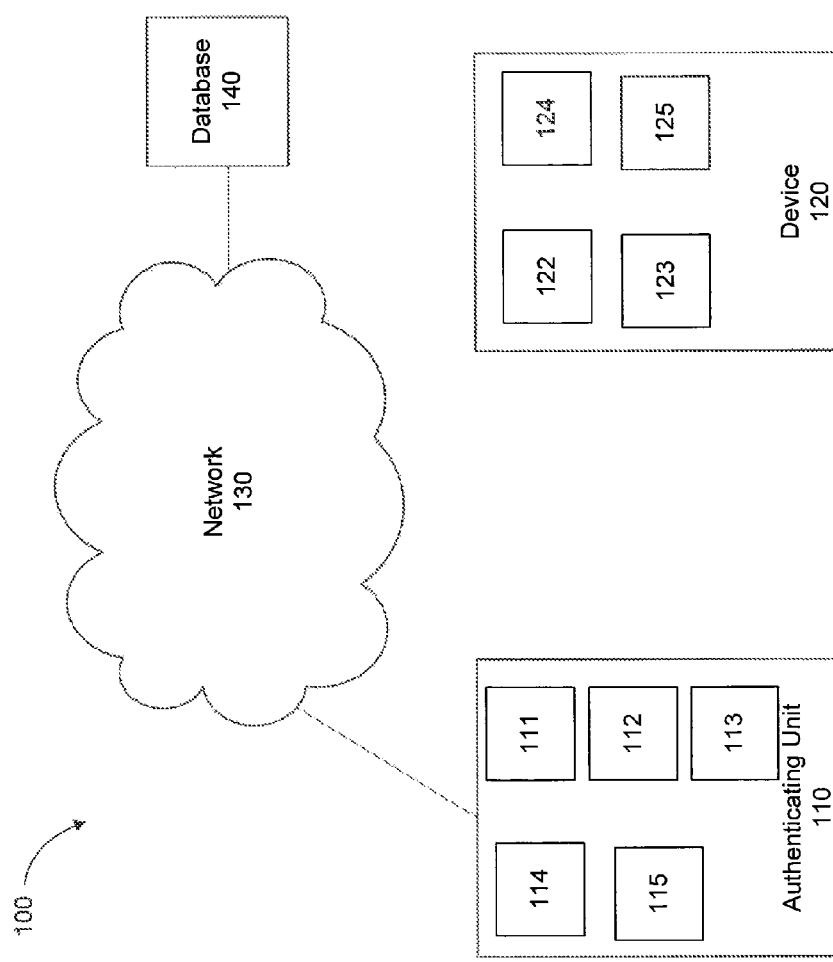
FIG. 1 is a diagram of an environment for authenticating a device, according to an exemplary embodiment.

FIG. 1 is a diagram of an environment 100 for authentication of device 120 using a hardware DNA signature, according to various embodiments of the present disclosure. Environment 100 includes an authenticating unit 110, one or more devices 120, a network 130, and a database 140. As would be appreciated by a person of ordinary skill in the art, embodiments of the disclosure may be used in any environment incorporating authentication of a device.

Device 120 includes at least one material that reacts to energy transmitted from authenticating unit 110. As would be appreciated by a person of ordinary skill in the art, a device 120 may be a computer, laptop, tablet, personal digital assistant, or any device which may be subject to authentication. Device 120 may further include measuring unit 122, communication interface 123, motion sensor 124, and energy unit 125, which will be described in further detail below with respect to other exemplary embodiments.

Authenticating unit 110 is configured to illuminate device 120 with a laser, visible light, an electromagnetic field, or other form of energy, and to monitor hardware DNA signature of device 120. Authenticating unit 110 includes an energy transmitting unit 111 to transmit the form of energy used to illuminate device 120 and a receiving unit 112 to monitor the response to the form of energy (i.e., the hardware DNA signature of device 120).

Authenticating unit 110 further includes a processor 113 to control circuits and/or elements of authenticating unit 110 to perform at least some of the operations of the present embodiment. Authenticating unit 110 also includes a user interface 114 to receive operating instructions and information from a user and to provide authentication status information to the user. For example, user interface 114 may be used to input unique identification information of a device being authenticated, initiate an authentication process, and indicate to the user the results of the authentication process. Authenticating unit 110 further includes a communication interface 115, which will be described in further detail below with respect to other exemplary embodiments.

Database 140 includes computer data storage for storing data within supporting data structures. In the present embodiment, database 140 stores authentication information, including an enrolled hardware DNA for a plurality of devices. The authentication information may be stored in database 140 through an enrollment process initiated by the manufacturer of a corresponding device, an end user, or another entity.

In the present embodiment, a user seeking to authenticate device 120 obtains a unique identification of device 120, for example, the device's serial number. In an embodiment, the unique identification is entered through user interface 114. As would be appreciated by persons of ordinary skill in the art, other methods for entering the device ID may be used with the present invention. Authenticating unit 110 may use this identification to query database 140 for authentication information corresponding to device 120. Authenticating unit may also use this information to determine the type of energy to transmit towards device 120 for authentication, the energy's intensity, or some other parameter related to the authentication of device 120.

Note that in the environment illustrated in FIG. 1, authenticating unit 110 communicates with database 140 through communication network 130 to obtain authentication information for device 120. A person of ordinary skill in the art would understand that authenticating unit 110 may communicate with database 140 using a direct physical link or through multiple networks using wired or wireless means. Accordingly, in various exemplary embodiments a database for storing authentication information may be co-located with a corresponding authenticating unit or be located remotely.

Figure 2:
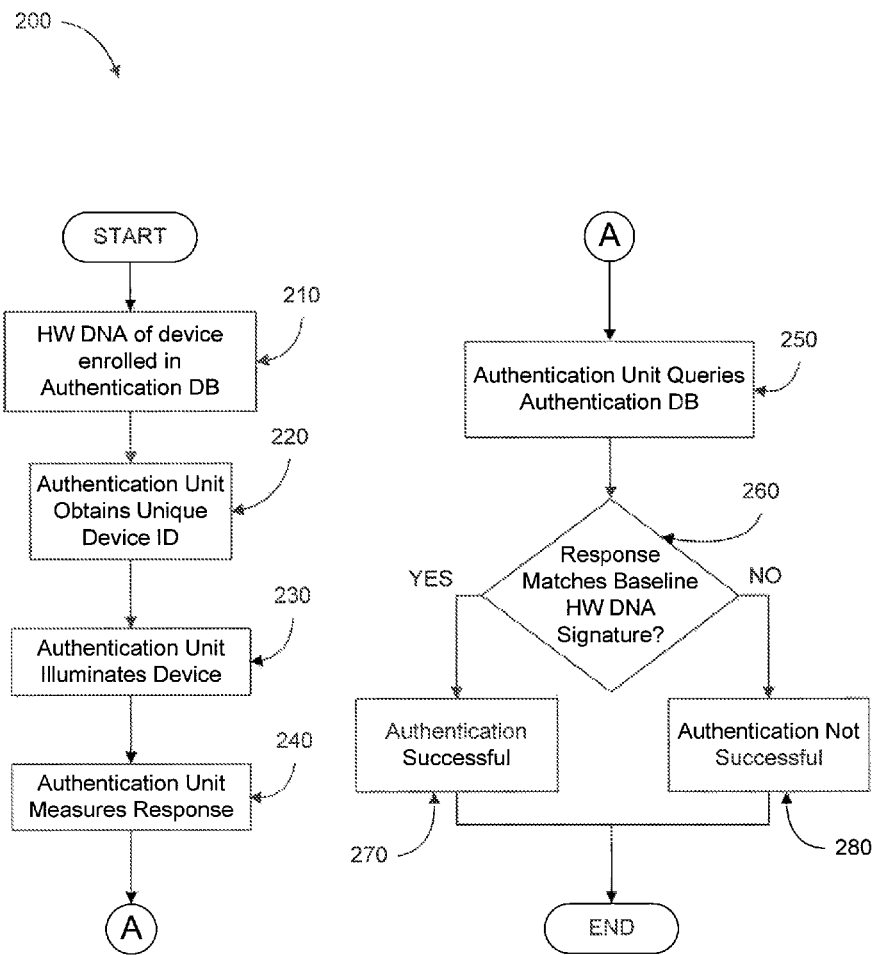
FIG. 2 is a flow diagram of a method for authenticating a device, according to an exemplary embodiment.

FIG. 2 is a flow diagram 200 of a method for authenticating a device according to an exemplary embodiment of the disclosure. The flowchart is described with continued reference to the embodiment of FIG. 1. However, the flowchart is not limited to that embodiment.

At block 210, device 120 is enrolled in authentication database (DB) 140. In particular, device 120 is illuminated with energy, for example a laser beam, at a predetermined intensity, and the device's response is measured, i.e., its baseline hardware (HW) DNA. The response may be converted into a different form (e.g., digital representation) for storage. The baseline hardware DNA is stored in a database, such as database 140.

The enrollment step may be performed by the manufacturer 150 of the device. Alternatively, the enrollment step may be performed by an owner of a device (e.g., a corporate or government entity). This may allow the device's owner to enroll new devices or re-enroll a device (i.e., generate and store a new hardware DNA) whenever the device undergoes a hardware change affecting its hardware DNA.

At block 220, the device ID is entered into authentication unit 110. The device ID may be obtained, for example, from a user entering the device ID into the authenticating unit.

At block 230, authenticating unit 110 illuminates device 120 with a corresponding energy using transmitting unit 111.

At block 240, authentication unit 110 measures a response from device 120 using receiving unit 112. The response may include a visible change in the surface of device 120, such as a change in color or displaying a particular pattern, in which case receiving unit 112 may include a lens and image processing circuitry for detecting, processing, and recording the visible change. Authentication unit 110 may convert the monitored response into a digital representation.

At block 250, authenticating unit 110 queries authentication DB 140 for authentication information, including the device's enrolled hardware DNA, based on the unique device ID.

At block 260, authentication unit 110 compares the measured response, i.e., the device's hardware DNA, to the baseline hardware (HW) DNA.

Device 120 is deemed authentic if the measured response matches the baseline hardware DNA of the authentication information (block 270). On the other hand, device 120 is deemed not authentic if the measured response does not match the baseline hardware DNA (block 280).

Although in the present embodiment the authentication unit queries the database for the baseline hardware DNA and performs the comparison locally, the comparison may be performed remotely. For example, authenticating unit 110 may provide the unique device ID and the measured response to a centralized server, and the centralized server may use the information to query database 140 and compare the measured response to the device's baseline hardware DNA.

Figure 3:
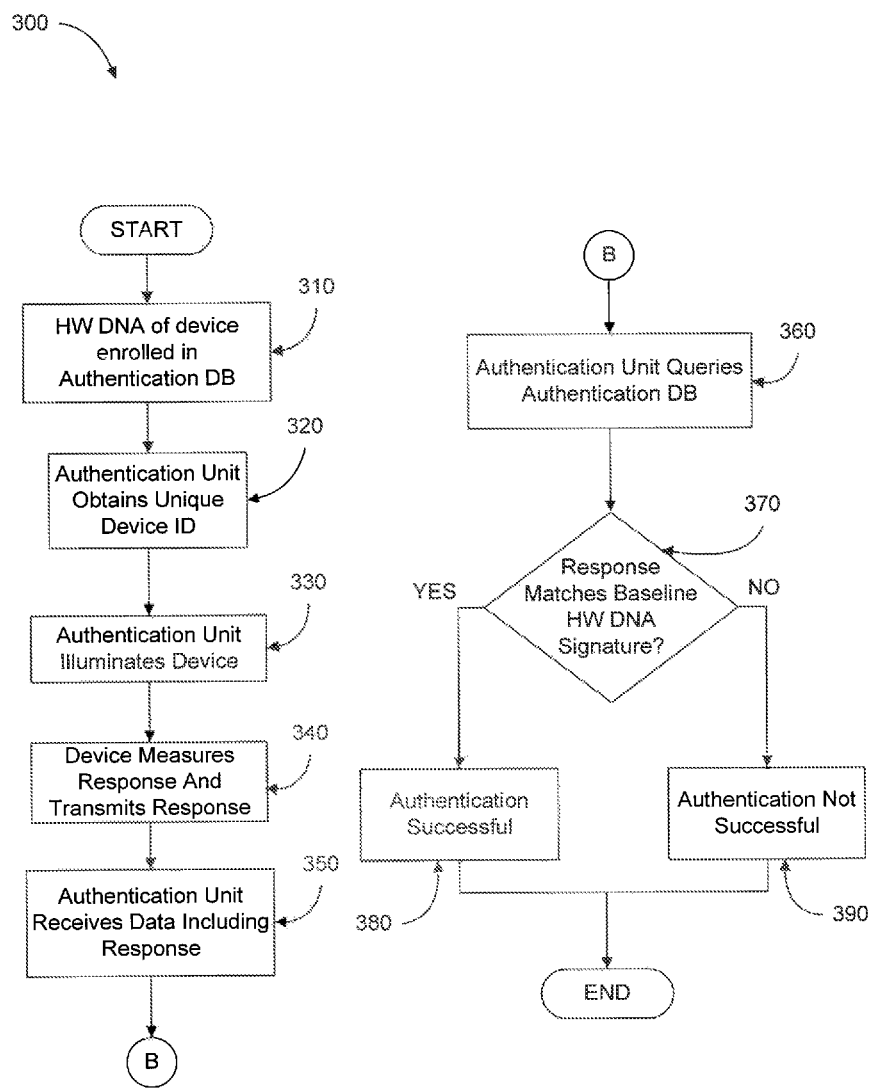
FIG. 3 is a flow diagram of a method for authenticating a device, according to another exemplary embodiment.

FIG. 3 is a flow diagram 300 of a method for authenticating a device according to another exemplary embodiment of the disclosure. The flowchart is described with continued reference to the embodiment of FIG. 1. However, the flowchart is not limited to that embodiment.

In exemplary embodiments described above, during authentication, the hardware DNA of device 120 is measured by authenticating unit 110, which is separate from device 120. However, in various exemplary embodiments device 120 may measure its hardware DNA and may transmit its hardware DNA to a corresponding authenticating unit via short range wireless communication. Specifically, returning to FIG. 1, in the present exemplary embodiment, authenticating unit 110 includes a communication interface 115 to communicate via short range wireless communication with devices such as device 120, and device 120 includes a measuring unit 122 for measuring a reaction to a corresponding energy and a communication interface 123 to communicate via short range wireless communication with devices such as authenticating unit 110. Such a configuration allows device 120 to generate a hardware DNA by measuring a response to incident energy locally. This may facilitate measurement of a reaction to incident energy that is not visual, such as a measurement of a resistance of a material within device 120.

At block 310, device 120 is enrolled in authentication database (DB) 140. In an embodiment, the device 120 is illuminated with energy, for example an electromagnetic signal, at a predetermined intensity. Measuring unit 122, instead of an external measuring unit, measures the device's response to the incident energy and communication interface 123 transmits data including the measured response. For example, the incident energy may affect the resistance of at least one material within device 120, and measuring unit 122 may perform a resistance test on the at least one material to determine the resistance of the at least one material in view of the incident energy. In such case, the measured resistance becomes the baseline hardware DNA.

Measuring unit 122 then provides the hardware DNA signature to communication interface 123 for transmission towards a corresponding communication interface (not shown in FIG. 1) of the device manufacturer. The baseline hardware DNA signature is enrolled for the device in authentication database (DB) 140. A person of ordinary skill in the art would understand that resistance may be measured in multiple ways. For example, measuring unit 122 may apply a voltage across a portion of the material and measure the flow of current across.

At block 320, the device ID is entered into authentication unit 110. The device ID may be obtained, for example, from a user entering the device ID into the authenticating unit.

At block 330, authenticating unit 110 illuminates device 120 using transmitting unit 11.

At block 340, measuring unit 122 within device 120 measures the resistance of the at least one material in view of the incident energy and provides the measurement to communication interface 123 for transmission towards authenticating unit 110. Device 120 may be triggered to measure the response of the at least one material in multiple ways. For example, a measurement may be triggered by a direct instruction transmitted via short range communication towards device 120, a manual switch, an electronic user interface, etc., operable by the user to request such measurement.

At block 350, authenticating unit 110 receives data from device 120 including the measured response.

At block 360, authenticating unit 110 queries authentication DB 140 for authentication information, including the device's baseline hardware DNA, based on the unique device ID.

At block 370, authentication unit 110 compares the measured response, i.e., the device's hardware DNA, to the baseline hardware DNA.

Device 120 is deemed authentic if the measured response matches the baseline hardware DNA of the authentication information (block 380). On the other hand, device 120 is deemed not authentic if the measured response does not match the baseline hardware DNA (block 390).

Figure 4:
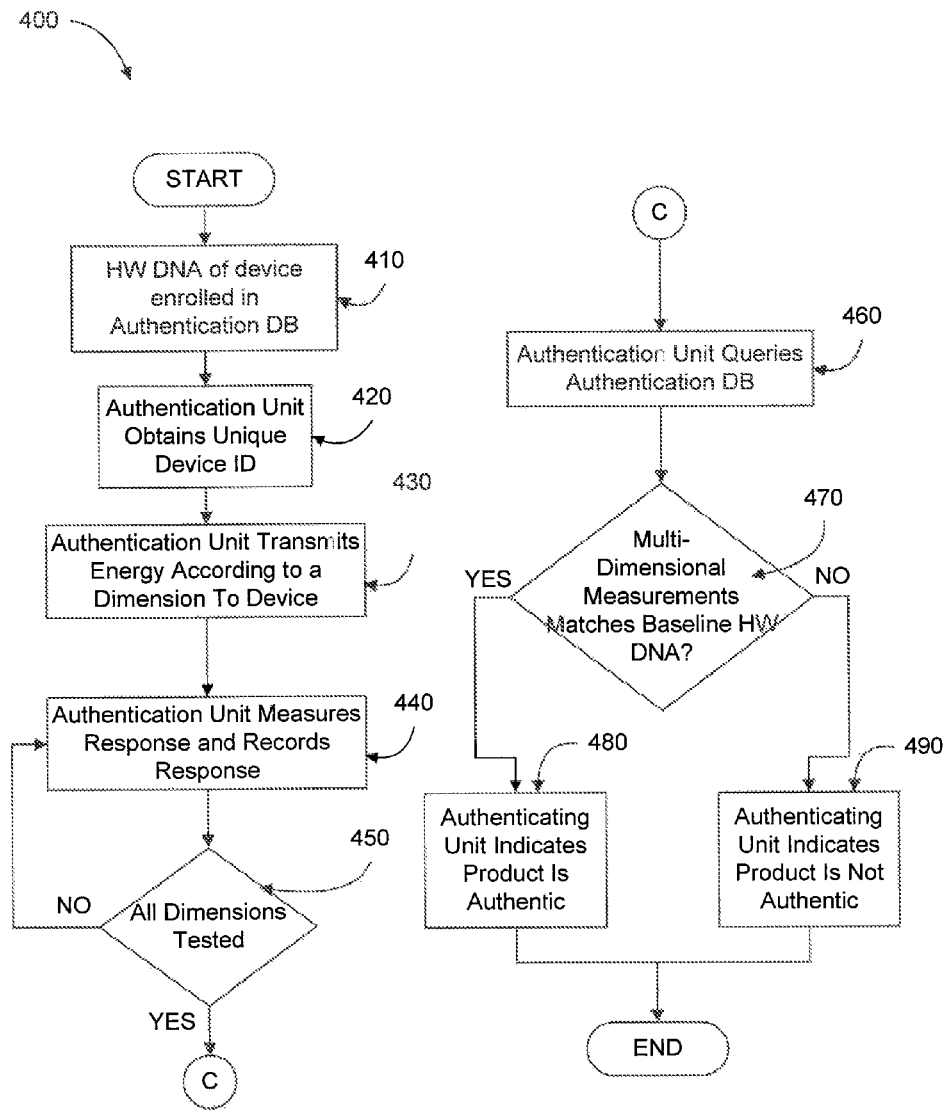
FIG. 4 is a flow diagram of a method for authenticating a device, according to yet another exemplary embodiment.

FIG. 4 is a flow diagram 400 of a method for authenticating a device according to yet another exemplary embodiment of the disclosure. The flowchart is described with continued reference to the embodiment of FIG. 1. However, the flowchart is not limited to that embodiment.

In the various exemplary embodiments described above, a hardware DNA signature includes only one dimension for authentication. In alternative embodiments, a hardware DNA signature may include multiple elements/dimensions. For example, one or more dimensions can be characterized by the inclination of a device relative to a horizontal axis when the device is exposed to incident energy, the incidence angle of the energy relative to a surface of the device, the intensity of the incident energy, the type of emitted energy, or a combination thereof. Accordingly, during authentication, device measurements may need to match some, all or a combination of the corresponding measurements in its baseline hardware DNA to be deemed authentic.

At block 410, device 120 is enrolled in authentication database (DB) 140. In particular, a multi-dimensional device hardware DNA profile is generated by directing an energy, for example a laser beam, at a predetermined intensity towards device 120 when device 120 is positioned at multiple predetermined orientations relative to the laser beam, and measuring the device's response for each orientation.

At block 420, the device ID is entered into authentication unit 110. The device ID may be obtained, for example, from a user entering the device ID into the authenticating unit.

At block 430, authenticating unit 110 illuminates device 120 using transmitting unit 111. The user will then position device 120 in one of the multiple predetermined orientations relative to the laser beam to get a measurement for the particular dimension. The predetermined orientation may be previously known to the user or may be provided to the user through user interface of authentication unit 110.

At block 440, authenticating unit 110 measures the response corresponding to the particular orientation and records the response in association with the orientation.

At block 450, authenticating unit 110 determines if there are additional dimensions, i.e., orientations, at which a response from device 120 needs to be measured. If there are more incidence angles at which a response needs to be measured, authenticating unit indicates that the device should be re-positioned for measuring a corresponding response and operation returns to step 440.

If there are no more incidence angles at which a response needs to be measured, operation proceeds to step 460 where authenticating unit 110 queries authentication DB 140 for authentication information, including the device's baseline hardware DNA, based on the unique device ID.

At block 470, authenticating unit 110 compares the measured responses to the multi-dimensional baseline hardware DNA. Device 120 is deemed authentic if the measured response matches the baseline hardware DNA of the authentication information (block 480). On the other hand, device 120 is deemed not authentic if the measured response does not match the baseline hardware DNA (block 490).

Although in the present embodiment the multiple dimensions are predetermined orientations relative to the laser beam, the present disclosure is not so limited. Other multi-dimensional schemes include multiple responses to energy incident to corresponding surfaces of the device, multiple responses corresponding to multiple intensities of incident energy into one or more surfaces of the device, multiple measurements of resistance corresponding to multiple materials of the device when the device is exposed to a form of energy, etc., without departing from the scope of the present teachings.

CONCLUSION it is to be appreciated that the Detailed Description section, and not the Summary and Abstract sections, is intended to be used to interpret the claims. The Summary and Abstract sections may set forth one or more but not all exemplary embodiments of the invention as contemplated by the inventor(s), and thus, are not intended to limit the invention and the appended claims in any way.

The invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

It will be apparent to those skilled in the relevant art(s) that various changes in form and detail can be made therein without departing from the spirit and scope of the invention. Thus the invention should not be limited by any of the above-described exemplary embodiments, but should be defined only in accordance with the following claims and their equivalents.

What is claimed is:

1. A method for authentication of a device comprising:
    transmitting energy towards the device at an angle of incidence;
    monitoring a response of the device to the energy transmitted towards the device at the angle of incidence;
    generating a signature of the device based on:
        the response of the device to the energy transmitted towards the device at the angle of incidence; and
        an inclination of the device relative to a horizontal axis when the device is exposed to the energy transmitted towards the device at the angle of incidence;

comparing the device signature to an enrolled signature for the device; and indicating that authentication of the device is successful when the generated signature matches the enrolled signature.

2. The method of claim 1, wherein transmitting the energy towards the device comprises:

illuminating a surface of the device with a laser beam.

3. The method of claim 2, wherein monitoring the response comprises:

capturing an image of the surface of the device.

4. The method of claim 1, wherein transmitting the energy towards the device comprises:

emitting an electromagnetic signal.

5. The method of claim 4, wherein monitoring the response comprises:

capturing an image of the surface of the device.

6. The method of claim 4, wherein monitoring the response comprises:

receiving a resistance measurement from the device.

7. The method of claim 1, further comprising:

receiving identification information for the device;

sending a request for the enrolled signature for the device to a database; and receiving the enrolled signature from the database.

8. A system for authenticating a device comprising:

a transmitter configured to transmit energy towards the device at an angle of incidence;

a receiver configured to monitor a response of the device to the energy transmitted towards the device at the angle of incidence; and a processor, coupled to the transmitter and the receiver, configured to:

generate a signature of the device based on:

the response of the device to the energy transmitted towards the device at the angle of incidence; and an inclination of the device relative to a horizontal axis when the device is exposed to the energy transmitted towards the device at the angle of incidence;

compare the device signature to an enrolled signature for the device; and indicate that authentication of the device is successful when the generated signature matches the enrolled signature.

9. The system of claim 8, wherein the transmitter comprises a laser and the receiver comprises an image capture device.

10. The system of claim 8, wherein the transmitter comprises an electromagnetic signal transmitter and the receiver comprises an image capture device.

11. The system of claim 8, wherein the transmitter comprises an electromagnetic signal transmitter, and wherein the receiver is further configured to receive a resistance measurement from the device.

12. The system of claim 8, further comprising:

a user interface module configured to receive identification information for the device.

13. A method for authentication of a device, the method comprising:

transmitting energy towards the device;

monitoring a response of the device to the transmitted energy at each of a plurality of angles of incidence;

generating a signature of the device based on:

the response of the device to the transmitted energy at each of the plurality of angles of incidence; and an inclination of the device relative to a horizontal axis when the device is exposed to the transmitted energy;

comparing the device signature to an enrolled signature for the device; and indicating that authentication of the device is successful when the generated signature matches the enrolled signature.

14. The method of claim 13, wherein transmitting the energy towards the device comprises:

illuminating the surface of the device with a laser beam.

15. The method of claim 14, wherein monitoring the response comprises:

capturing an image of the surface of the device.

16. The method of claim 13, wherein transmitting the energy towards the device comprises:

emitting an electromagnetic signal.

17. The method of claim 16, wherein monitoring the response comprises:

capturing an image of the surface of the device.

18. The method of claim 16, wherein monitoring the response comprises:

receiving a resistance measurement from the device.

19. The method of claim 13, further comprising:

receiving identification information for the device;

sending a request for the enrolled signature for the device to a database; and receiving the enrolled signature from the database.

20. The system of claim 8, wherein the processor is further configured to generate the signature of the device based on:

an intensity of the incident energy in the response, and a type of the incident energy in the response.

* * * * *